(12) United States Patent
Trowbridge (10) Patent No.: US 7,685,589 B2
(45) Date of Patent: Mar. 23, 2010

(54) FILE LOADING SYNCHRONIZATION

(75) Inventor: Sean E. Trowbridge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 10/965,504

(22) Filed: Oct. 14, 2004

(65) Prior Publication Data
US 2006/0085482 A1  Apr. 20, 2006

(51) Int. Cl.
G06F 9/44 (2006.01)
(52) U.S. Cl. .................. 717/166; 717/162
(58) Field of Classification Search .......... 717/162–167
See application file for complete search history.

(56) References Cited

U.S. PATENT DOCUMENTS

| 6,915,511 | B2 * | 7/2005 | Susarla et al. ............... 717/166 |
| 7,188,093 | B2 * | 3/2007 | Zhong ......................... 706/55 |
| 7,398,523 | B2 * | 7/2008 | Martin et al. ............... 717/166 |
| 7,406,687 | B1 * | 7/2008 | Daynes et al. .............. 717/166 |
| 7,546,593 | B2 * | 6/2009 | Petev et al. .................. 717/166 |
| 2003/0220984 | A1 * | 11/2003 | Jones et al. .................. 709/219 |
| 2004/0019887 | A1 * | 1/2004 | Taylor et al. ................ 717/166 |
| 2005/0060698 | A1 * | 3/2005 | Boykin et al. ............... 717/166 |
| 2005/0193258 | A1 * | 9/2005 | Sutton ......................... 714/32 |

OTHER PUBLICATIONS

Kimbleton et al., "A load leveling support methodology for networking," 1976, Winter Simulation Conference, p. 247-253.*
Tyler et al., "Load Leveling for Control of Distributed Processing Systems," 1987, ACM, p. 465.*
Liang et al., "Dynamic Class Loading in the Java™ Virtual Machine," Oct. 1998, ACM, p. 36-44.*

* cited by examiner

Primary Examiner—Wei Y Zhen
Assistant Examiner—Qing Chen
(74) Attorney, Agent, or Firm—Lee & Hayes, PLLC (57) ABSTRACT

Systems and methods to synchronize file loading operations are described. In one aspect, file loading operations are divided into multiple loading levels. The loading levels are incremental with respect to one another. The loading levels are executed in a sequential order. Each loading level includes operations that are independent and distinct of operations of all other loading levels. The systems and methods load a file to an allowed loading level. The allowed loading level includes operations associated with one or more of the multiple loading levels.

31 Claims, 4 Drawing Sheets

FILE LOADING SYNCHRONIZATION

TECHNICAL FIELD

This disclosure relates to loading files and file dependencies into a process for execution.

BACKGROUND

Loading executable files into a system generally requires synchronization, as shared resources and global state are inevitably involved. Some aspects of such synchronization involve system infrastructure operations. Other aspects of synchronization may involve loading of user code. Such operations typically include loading file dependencies (perhaps recursively) as part of the implementation. Accordingly, loading executable files typically requires a balanced approach to loading operations to enable maximal concurrency, while avoiding race conditions, deadlocks, and access to partially initialized state. A race condition is an undesirable situation that occurs when a device or system attempts to perform two or more operations at the same time, but because of the nature of the device or system, the operations must be done in the proper sequence in order to be done correctly. Deadlock is a condition that occurs when two processes are each waiting for the other to complete before proceeding. The result is that both processes hang. Access to partially initialized state is a condition wherein the state of the component or object being accessed has not been initialized.

SUMMARY

Systems and methods for file loading synchronization are described. In one aspect, file loading operations are divided into multiple loading levels. The loading levels are incremental with respect to one another. The loading levels are executed in a sequential order. Each loading level includes operations that are independent and distinct of operations of all other loading levels. The systems and methods load a file to an allowed loading level. The allowed loading level includes operations associated with one or more of the multiple loading levels.

BRIEF DESCRIPTION OF THE DRAWINGS

In the Figures, the left-most digit of a component reference number identifies the particular Figure in which the component first appears.

DETAILED DESCRIPTION

Overview

Before a runtime loads or publishes an assembly into an application domain for execution by a runtime host, the runtime automatically executes and completes the assembly's initialization code. Such initialization code creates state for the assembly, for example, by validating assigned security characteristics, creating data structures, executing user callbacks, determining whether the assembly will be shared, and/or the like. Loading of assemblies may be a recursive process, wherein each assembly may need to examine various aspects of dependent assemblies during load operations. Assembly dependencies may also be circular, causing loading deadlocks if not detected and addressed.

In view of the above, and during assembly loading operations, a conventional runtime synchronizes access to shared resources to avoid race conditions, deadlocks, and/or re-entrant access to partially initialized module state. In part, such synchronized access is accomplished by enforcing a set of restrictive assembly rules that initialize the assembly on a single thread, rather than multiple threads, wherein automatic execution of initialization code may cause delays and deadlocks. Restricting initialization code execution to a single thread serializes access to static dependencies. In contrast to such static dependencies, dynamic dependencies that are resolved at runtime (e.g., a dependency on a dynamic link library (DLL)), are not allowed in initialization code. These restrictive rules are designed to try to properly initialize static dependencies before the assembly is loaded into an application domain, wherein invariants may rely on proper allocation of slots in local storage, and/or guarantees to user code such as the loading of events or module constructors. Moreover, these restrictive rules are designed to avoid circular references, which are also problematic, as there is no well defined bottom-up order.

In contrast to conventional systems for file loading, the following systems and methods for file loading synchronization implement a sophisticated synchronization scheme that provides:

- Support for concurrent loading of an assembly on separate threads in a multithreading environment.
- Top-down (or "delay load") loading semantics for all file dependencies.
- Support for code re-entrancy to the loading process in a deadlock-free manner.
- Deadlock-free user file initialization code semantics.
- Support for circular file dependencies.
- Sophisticated runtime loader mechanisms (e.g., security checks and code sharing); mechanisms that may require recursive loading of arbitrary other assemblies during the loading process.

These and other aspects of the systems and methods for file loading synchronization are now described in greater detail.

An Exemplary System

Figure 1:
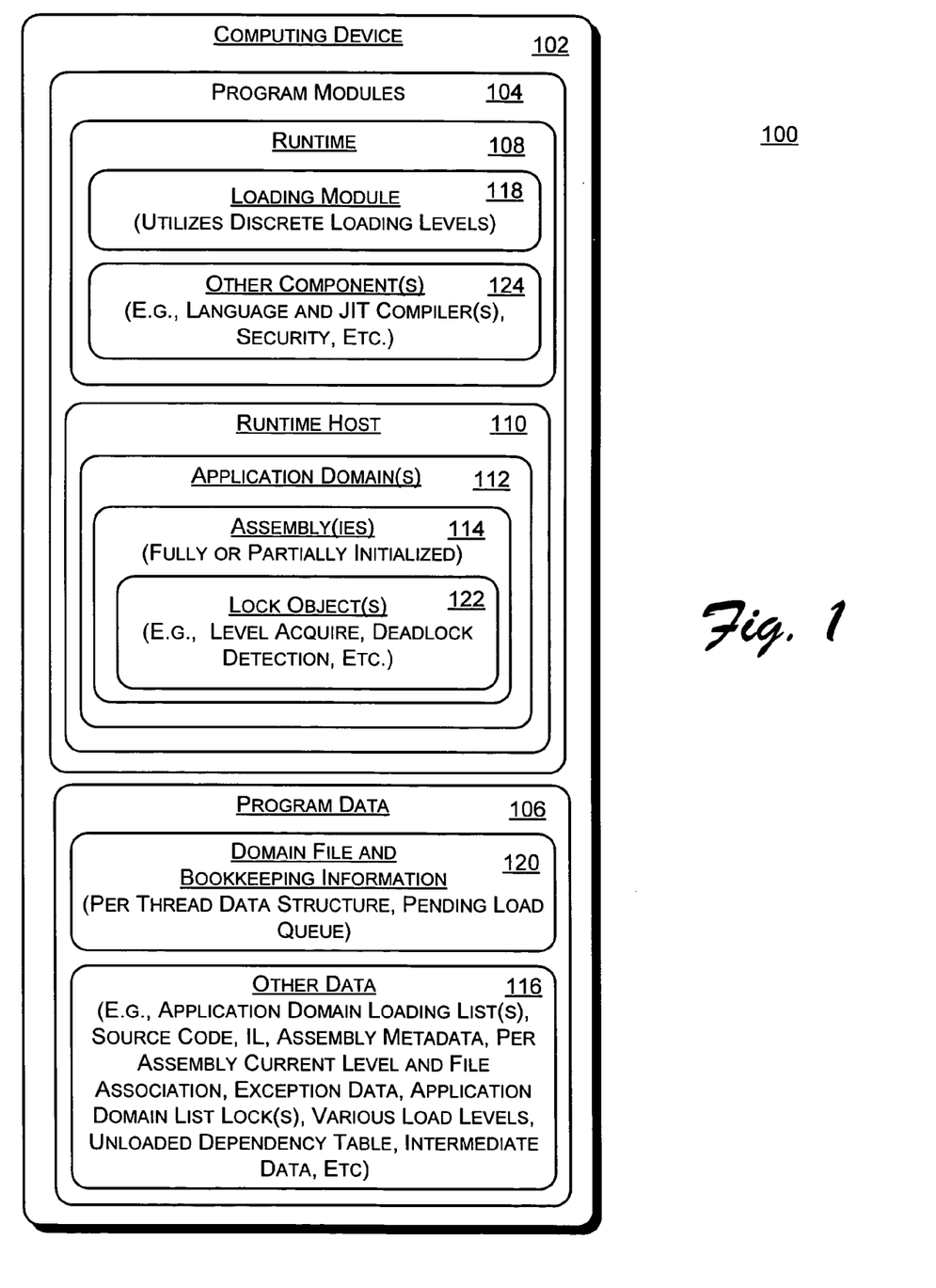
FIG. 1 illustrates an exemplary system for file loading synchronization.

FIG. 1 illustrates an exemplary system 100 for file loading synchronization. System 100 includes computing device 102, which includes program module(s) 104 and program data 106. Program modules 104 include, for example, runtime 108 and runtime host 108. Runtime 108 provides a runtime environment that manages the execution of program code and provides services such as memory and exception management, debugging, profiling, security, etc. Runtime host 110 loads and initializes runtime 110. Runtime hosts 110 include, for example, ASP.NET, Internet Explorer, and/or so on. A runtime host 110 creates one or more application domain(s) 112 within its process for loading one or more assemblies 114. An assembly 114 is a logical unit of functionality that includes any number of files such as dynamic link libraries (DLLs) or executables and data, as described in a manifest associated with the assembly. For purposes of illustration, metadata, which is shown as a respective portion of "other data" 116, comprises one or more such manifests.

When runtime host 110 is executed, runtime 108 locates and loads one or more assemblies 114 that make up the application into the respective application domain(s) 112. To this end, runtime 108 includes loading module ("loader") 118. In contrast to conventional systems, loader 118 divides/segments assembly 114 loading operations into a number of discrete assembly loading levels, or operations. Loader 118 implements loading operations in a defined loading level sequence from a first loading level to a subsequent loading level. Operations associated with any particular loading level are incremental and independent with respect to operations associated with any other loading level. Additionally, loader 118 may implement multiple levels of assembly 118 loading operations with different respective threads of execution. This is in contrast to existing systems that require assembly loading operations to be implemented by a single thread of execution.

The particular number of loading levels implemented by loader 118 and their respective operations are arbitrary. That is, the particular number of loading levels implemented by loader 118 is a function of desired loader architecture. In one implementation, for example, loader 118 divides the loading process into eleven (11) independent and distinct loading levels, including:

- Create (level 1), wherein a bookkeeping infrastructure (e.g., see "bookkeeping information 120") are generated for the load.
- Begin (level 2), wherein the domain file is published into a loading list of an associated application domain 112 (e.g., see the loading list(s) portion of "other data" 116);
- FindNativeImage (level 3), wherein a cached precompiled executable code image associated with the assembly 114 is located;
- VerifyNativeDependencies (level 4), wherein dependencies of the native image are evaluated to ensure that any hard pre-just-in-time (prejit) binding constraints are satisfied.
- Initialize (level 5), wherein sharing decision operations are performed to share one or more portions of an assembly 114 with other application domains 112.
- Sharers (level 6), wherein domain neutral related constraints are propagated by loading any already existing assembly(ies) 114 that are dependent on the entity currently being loaded. These operations also include loading this assembly 114 in other application domain(s) 112 for which it is a dependency. (Note an application domain 112 boundary may be crossed when executing these operations).
- EagerFixups (level 7), wherein native image initializations are performed. Typically such initializations extract pointers from other entities and embed them into the assembly being loaded.
- LoadLibrary (level 8), wherein managed code is executed for the module to call LoadLibrary on the image (and execute its IJW entry point and build thunks, if applicable).
- DeliverEvents (level 9), wherein profiler and debugger load events for the assembly are delivered to previously registered user event handlers. Application domain-based events related to assembly load are raised. In one implementation, a module constructor callback is added during this level's operations.
- Publish (level 9), wherein the assembly 114 is published as usable without going through loader 118.
- Loaded (level 10)—this is the final level, which indicates that assembly 114 is free to be used by its associated application domain 112.

In one implementation, loader 118 implements an error load level. The error load level is used to propagate transient exceptions that may occur when performing a loading stage of an assembly 114. In such a scenario, assembly 114 will not be available to the associated application domain 112. Responsive to a transient exception, the level is left at an intermediate state so that level can later be retried.

In this implementation, assembly 114 includes lock object 122. Lock object 122 provides loader 118 with information and capabilities to load the assembly 114. For instance, lock object 122 indicates a current load level to which assembly 114 has been loaded, an indication of a loading level to which the assembly 114 can subsequently be loaded (a constrained load level), deadlock detection, and an acquire method to acquire a lock on the assembly 114 prior to performing load operations.

Loader 118 can halt level-based loading operations at the completion of any particular loading stage. If the loading stage at which loading operations are stopped is a final loading level, loading operations for the assembly 114 are complete. Whereas, if the loading stage at which loading operations cease is not the final loading level, the assembly 114 is partially loaded and in a partially initialized state. The partially initialized state is coherent and well defined by operations associated with respective ones of the loading level(s) implemented by loader 118 on assembly 114. Thus, Loader 118 provides runtime 108, and/or any assembly 114 that depends on a partially initialized assembly 116, with a set of guarantees to control uninitialized assembly state in a multi-threaded environment when there are circular causal dependencies.

For example, consider the following circular dependencies shown by assemblies A, B, and C, each of which represent a respective assembly 114 in an initialized and/or partially initialized state. Assembly A calls assembly B. Assembly B calls assembly C, and assembly C calls assembly A. C can call A, and C may encounter A in a partially initialized state. However, the partially initialized state of A is well defined by specific operations of loading level(s) that have been performed on A, such that C's load will not be allowed to finish prematurely before A has completed initializing. This means that deadlock between A and C will not occur.

When assembly 114 load operations rely on dependencies that do not trigger a load of a second, different assembly 114, the dependencies are loaded to the allowed level. The allowed level may or may not be the requested level as described below in the section titled "Exemplary Loading Operations." However, if a load of a first assembly 114 recursively triggers another load of a second/different assembly 114, loader 118 performs loading operations for the second assembly 114 only to the loading level immediately preceding, or prior to the particular loading level being performed for the first assembly 114. (The particular loading level indicating the loading operations have been, will be, or that are being performed with respect to a particular assembly 114 are maintained in bookkeeping information 120).

In other words, when loading a dependency from within a particular assembly 114 that has been loaded to a particular level, and if no dependency loops are detected, the dependency will be loaded to the particular level. However, if potential for a deadlock due to a dependency loop is detected, the dependency will be loaded up to the immediately preceding level to the particular level. This avoids deadlocks associated with reentrant code. For instance, if the load is executed from a module that is in the debugger level, there's a guarantee that the load is at least executed to the immediately preceding step to the debugger level (e.g., and our example, the sharing code level). In view of such criteria, deadlock will not occur (e.g., a level 2 load will never do a level 4 load)

For example, a first assembly is loaded is level 6. If the first assembly depends on a second assembly that is re-entrant with respect to the first assembly, the loader 118 will load the second assembly only to level 5. In this implementation, loader 118 does not detect a circularity until an actual circular load is attempted (e.g., when the second assembly attempts to load the first assembly to level 6, there is only a guaranteed provided to load the first assembly to level 5.) In such scenarios, the loading level on any given thread that is performing loading operations (of loader 118) will never increase as a first assembly is traversed to a second assembly, a third assembly, etc. This synchronization strategy guarantees that infinite recursions will not occur. Conceptually, this creates with respect to an application domain 112, a lock per assembly 114 per loading level. Since a thread can only take locks with a strictly lower level, there is no danger of deadlock. In one implementation, such a locking strategy (a lock per assembly 114 per loading level) is implemented by the loader 118 using a ListLock on an application domain 112 (ListLocks include FileLoadLocks) to track the load level of partially loaded assembly(ies) 114 as they pass through the loader 118.

As indicated above, enforcing load level constraints is done explicitly with a bookkeeping data structure 120 (PendingLoadQueue). This is a per thread data structure that may be allocated on the stack in the associated application domain 112 as needed. The data structure is used to track the maximum allowed load level on the thread. This is explicitly bumped down to one level below the current loading stage by the main loop of loader 118. In another implementation, the data structure is also used as a queuing mechanism to delay requested loads which are unable to be fulfilled because of level constraints. Any time a load is completed (and thus relax the level constraints), the queue is "pumped" to perform any incremental loads which are now legal. Note that by the time we finish the top level load for an assembly 114, the queue should be empty.

Loading a Set of Dependencies Beyond a Current Load Level

In some situations a first assembly that has not been completely loaded may have a dependency that requires a different set of assemblies to be completely loaded. For example, if a first assembly relies on security capabilities of a runtime before the first assembly can be properly verified or authenticated, assemblies corresponding to the runtime's security capabilities must generally be completely initialized and loaded before they can be properly utilized by the first assembly. In this scenario, the first assembly has not been completely loaded. In another example, consider that policy evaluation requires instantiation of permission objects from every assembly listed in a particular policy. This generally requires executing arbitrary code in the identified policy-based assemblies; hence a load on the policy code must have been fully performed by the assembly. In existing systems, such scenarios are the source of bugs and ad-hoc workarounds.

In contrast to existing systems, loader 118 provides same-level dependency loads, along with explicit deadlock detection. More particularly, loader 118 provides a mechanism for a first assembly 114 that has not been completely loaded to completely load (e.g., to a "loaded level") one or more different sets of assemblies 114—i.e., beyond a current level to which the first assembly is loaded. To these ends, loader 118 pushes the current allowed loading level (a respective portion of "other data" 116) onto the stack in the associated application domain 112, and sets the new allowed loading level for the dependent set of assemblies 114 to correspond to a "loaded level". After loading operations for the dependent set of assemblies 114 have indicated that loading operations have completed (i.e., to the requested fully loaded level), the allowed load level for the first assembly 114 is popped from the stack for complete the corresponding load operations on the first assembly 114.

Unexpected Circular Dependencies

If the dependent assemblies 114 are not loaded to the new allowed loading level as indicated above, but rather loaded to a level that is less than or equal to two (2) levels below the current level of the first assembly 114, an unexpected/undesired circular dependency was encountered. Recall that a loading level that is one less than a current loading level of the first assembly 114 indicates a successful partial load indicative of an expected. In other words, a load may not be able to be performed to the (n–1) level without triggering a deadlock. This is possible, for example, if the code executed under elevated loading attempts to load any assemblies which were in the process of loading before the elevation occurred. Such a case will surface as a reentrant load, where the load in progress is at (n–2) or below. At such a point the loader 118 is faced either with deadlocking on the dependent load, or else failing to meet the guaranteed load level for its result. Rather than do either of these, loader 118 throws an exception indicating presence of an illegal circular dependency.

Domain Neutral Assemblies

One way a runtime 110 shares resource(s) between application domains 112 is the use of domain neutral assemblies (e.g., one or more assemblies 114). What this means is that assembly 114 objects may be referenced/shared across multiple application domains. This sharing also extends to the data contained by those structures, including classes and executable code. Shared resources do not include any user visible state, chiefly class static variables, which are explicitly un-shared via a domain-local storage mechanism. Decisions about when to share loader data structures are carefully considered, since different application domains may have different configuration parameters, parameters which may require different implemented behaviors. For example, fusion binding configuration and application domain security setting parameters are carefully considered. Furthermore, a particular assembly is shared only if all other assemblies it references can also be shared. This is because direct pointers are hard-wired into the code and data structures of dependencies. In view of the above, systems and methods for file loading synchronization take the full binding closure of an assembly into consideration when making sharing decisions.

For example, during the initialize stage of assembly 114 loading operations (e.g., see the operations of block 202 of FIG. 2), loader 118 makes a decision about whether to create a new assembly, or to share an existing assembly. The first step in this process is to decide whether the assembly is supposed to be domain neutral, under the application domain's loader optimization policy. If it is the case, an existing domain neutral assembly is typically shared. To this end, the loader 118:

Looks for any available assemblies in the shared domain for the particular file being loaded. (Note there may be none, one, or more than one.)

Expands the full static binding closure of the assembly in the current application domain. This involves binding all assembly references found in the manifest, and transitively in the dependencies' manifests.

Compares the identity of each assembly in the binding closure with the binding closures of each matching assembly found in the shared domain.

Evaluates the security grant set of each assembly in the binding closure against this application domain's policy, and compare that grant set to the corresponding assembly in the closure list to be matched.

In view of the above, if loader 118 determines that it has a compatible assembly 118, the loader 118 simply references that for use in the target application domain 112. However, if there is no such assembly 114 available, then loader 118 creates a new assembly 114 and stores the end the shared domain for future sharing. During these operations, one or more different application domains 112 may be trying to create the same shared assembly 114. Since a file load lock (FileLoadLock) operation is typically associated only with the file in the context of a single application domain 112, loader 118 performs additional synchronization operations synchronization to resolve any such races to create the same shared assembly 114. More particularly, loader 118 utilizes a list lock in a shared domain 112, wherein elements are provided on a file identity basis. This ensures that only a single application domain 112 is trying to create a given assembly 114 for a given file at a time.

In one implementation, loader 118 further implements such loading operations for module loads (e.g., by evaluating a RID map entry in the parent assembly to see if a module to already exists). A module is a respective component of an assembly 114.

Loaded Image Invariant

Loader 118 enforces an invariant that code associated with an assembly 114 does not run in an application domain 112 until the assembly 114 has been loaded. Although, the assembly 114 may be partially loaded to a limited extent, for example, when a circular dependency is located in initialization logic. This guarantees that a dependent assembly has at least started running its initialization code (which is the last step of loading). Loader 118 accomplishes this even in view of the following situations:

Application domain I loads assembly A as a domain neutral assembly A(i)
Application domain II loads assembly A, and shares A(i)
Application domain I executes a method M in A(i)
M is jitted (just-in-time compiled) in A(i)
M calls method N in assembly B.
Assembly B is loaded as domain neutral assembly B(i) in app domain I.
The jit compilation of M is finished, and a call to N in B(i) is part of the method code.
M is executed in app domain I; N is now jitted in B(i).
Application domain II calls M. Since N is already jitted, M calls N directly. N would now be running in app domain II, even though B has not been formally loaded there.

Loader 118 addresses the above problem by tracking loaded dependencies, and by propagating loads to one or more other application domains 112 that share related assembly(ies) 114 (or modules). For example, when a new assembly 114 is created which is referenced by an existing domain neutral assembly 114, any application domain 112 which is loaded the referencing assembly 114 also loads this assembly 114 before it is used. In another example, when an application domain 112 uses an existing domain neutral assembly 114, the application domain also loads a existing assemblies 114 referenced by the existing domain neutral assembly. In yet another example, when a new module (a file in an assembly 114) is created for an existing domain neutral assembly 114, any application domain 112 which has the parent assembly 114 loaded will also loads a module before it is used. Such exemplary additional loads are propagated during the share stage of loading (e.g., level 6 of the exemplary loading levels described above in paragraph [0014]). Note that the first and third actions transition to another application domain 112 and perform what will appear to be a spontaneous load event in that application domain.

In this manner, loader 118 ensures that an assembly 114 will not execute in any application domain 112 until it is loaded into every application domain 112 within which it may be shared.

Exemplary Loading Operations

Figure 2:
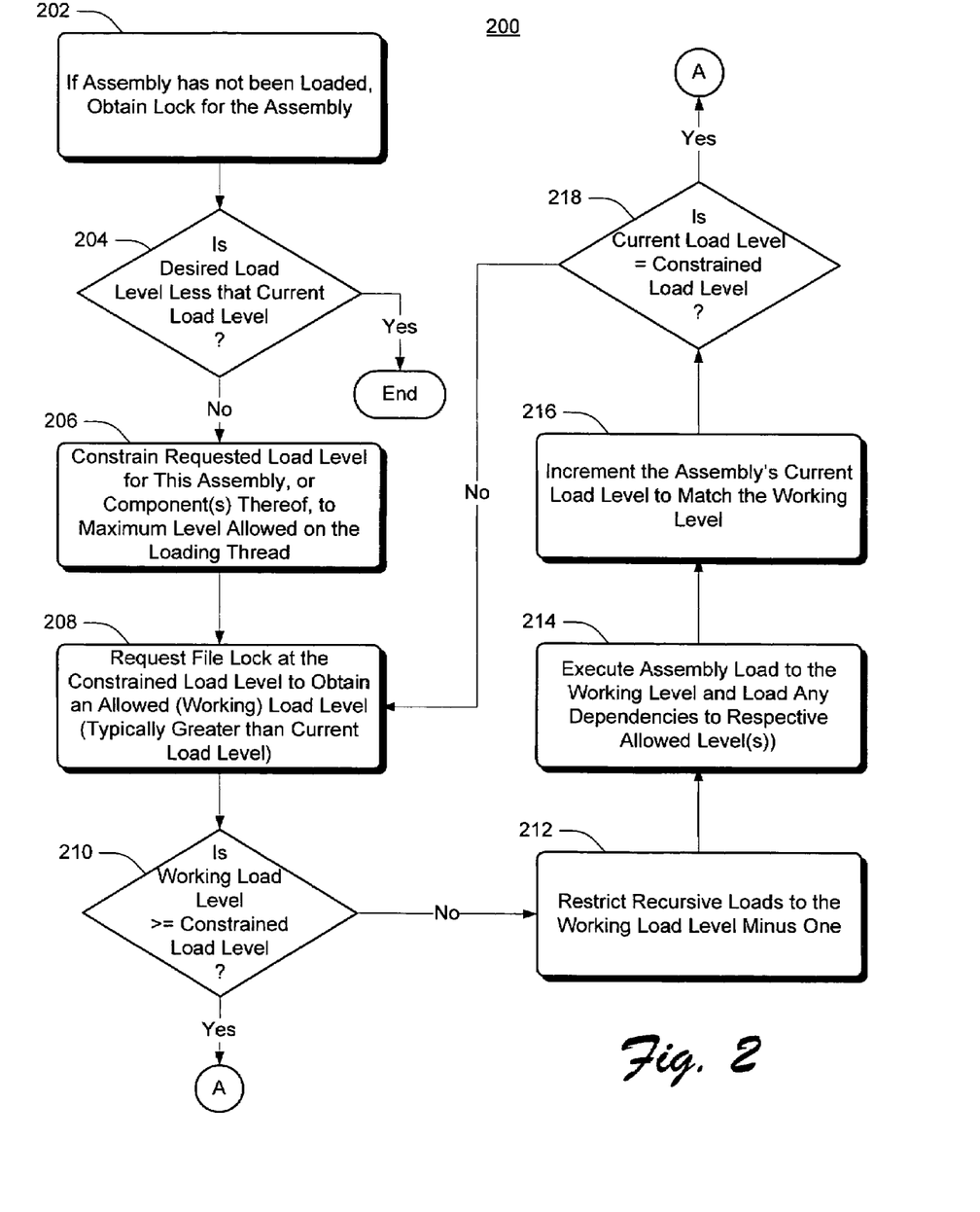
FIG. 2 shows an exemplary procedure for file loading synchronization.

FIG. 2 shows an exemplary procedure for file loading synchronization. For purposes of exemplary illustration, the operations of FIG. 2 are described with respect to the components of FIG. 1. (In the Figures, the left-most digit of a component reference number identifies the particular Figure in which the component first appears). At block 202, and responsive to an indication by runtime host 110 to load an assembly 114 (or one or more portions thereof) into an application domain 112, loading module 118 ("loader") obtains a lock, if necessary, for the component to be loaded (e.g. the assembly 114). To this end, loader 118 looks for a loaded file with the same identity as the assembly 114. If a loaded file is found, the loading operation is complete. Otherwise, using the application domain's list lock (e.g., shown as a respective portion of "other data" 116), loader 118 again looks for a loaded file with the same identity as the assembly 114. As above, if a loaded file is found that loading operation is complete. Otherwise, loader 118 evaluates the application domain's list lock for a lock on the assembly. If the lock is found, it is used, and if the lock is not found a new one is obtained. In either case, although the lock has been identified/created, the lock has not been acquired for investigating the current load level associated with the assembly 114.

At block 204, loader 118 determines whether the load level desired by the runtime host 110 (e.g., requested load level) is less than the current load level associated with the assembly 114. If so, the loading operation of the assembly 114 is already complete, and operations of procedure 200 end. If the requested load level is not less than the current load level associated with the assembly 114, operations of procedure 200 continue at block 206. At block 206, the requested load level is constrained to the maximum loading level allowed for the loading thread.

At block 208, loader 118 utilizes lock object 122 to request the file lock at the constrained load level. Responsive to this request, lock object 122 returns an allowed/working load level to which the loader 118 is allowed to load the assembly 114. At block 210, it is determined whether the working load level is greater than or equal to the constrained load level. If so, then the assembly 114 is already loaded at least to the allowed loading level and operations continue at block 304 of FIG. 3, as indicated by on page reference "A". If the working load level is less than the constrained load level, operations continue at block 212, wherein recursive load(s) are restricted to being loaded by loader 118 to the working load level associated with the assembly 114, minus one (1). A recursive load represents a dependency of the assembly 114 being loaded. In one implementation, a loading dependency may represent a different assembly 114 or component thereof. In another implementation, the loading dependency is an abstraction which obtains its meaning from the particular operations being performed at a particular level. The term may mean different things at different levels.

At block 214, loader 118 executes the assembly load to the working level. During these operations, the loader 118 loads dependencies to respective allowed level(s)—i.e., a re-entrant dependency is loaded to the working level minus one, whereas non-reentrant dependencies are loaded at least to the working level. In one implementation, and during the operations of block 214, if a first assembly 114, which has not been completely loaded and which can only be loaded to the working level, includes a dependency that requires a different set of assemblies 114 to be completely loaded beyond the working level. In this scenario, the different set of assemblies is completely loaded by the loader 118 to resolve the dependencies of the first assembly 114. This provides initialization and other guarantees to the first assembly 114, while still restricting loading operations of the first assembly 114 to the working load level. Moreover, assembly loading operations of block 214 enforce the invariant that code associated with an assembly 114 does not run in an application domain 112 until the assembly 114 has been loaded, as described in greater detail above in the section titled "Loaded Image Invariant."

At block 216, the assembly's current load level is incremented to match the working level. This indicates that the assembly 114 has been loaded in the operations of block 216 to the working level. At block 218, loader 118 determines whether the current load level is greater than or equal to the constrained load level associated with the assembly 114 being loaded. If not, operations of loading procedure 200 continue at block 208, as described above, until the assembly 114 is loaded to the constrained load level. If the current load level is greater than or equal to the constrained load level, procedure 200 continues at block 302 of FIG. 3, as indicated by on page reference "B".

Figure 3:
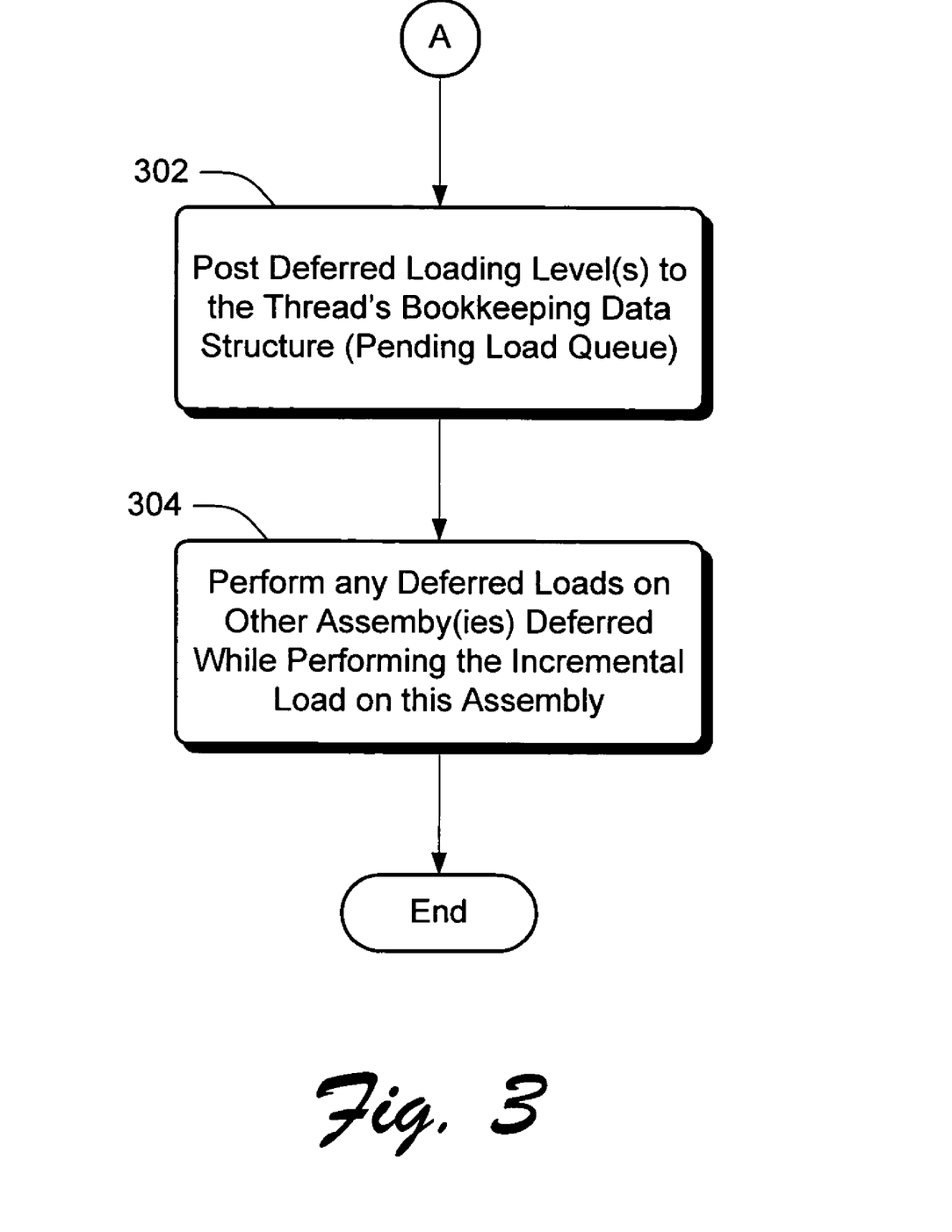
FIG. 3 shows an exemplary procedure for file loading synchronization. The procedure is a continuation of the exemplary procedure of FIG. 2.

FIG. 3 shows an exemplary procedure for file loading synchronization. The procedure is a continuation of the exemplary procedure of FIG. 2. For purposes of exemplary illustration, the operations of FIG. 3 are described with respect to the components of FIG. 1. (In the Figures, the left-most digit of a component reference number identifies the particular Figure in which the component first appears). At block 302, loader 118 posts any deferred loading levels to a pending load queue in the thread's bookkeeping data structure 120. A deferred loading level is obtained when the runtime host 110 requests a particular loading level that is constrained to a lower loading level. For example, if the runtime host 110 requests a loading level of 8, but the assemblies lock object 122 indicates that the loading level is to be constrained to loading level 4, then loading levels 5, 6, 7, and 8 are deferred loading levels. At block 304, loader 118 performs any deferred loads, including loads on one or more different assemblies 114 that were deferred while performing the incremental load on the current assembly 114.

An Exemplary Operating Environment

Although not required, the systems and methods for file loading synchronization are described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 4:
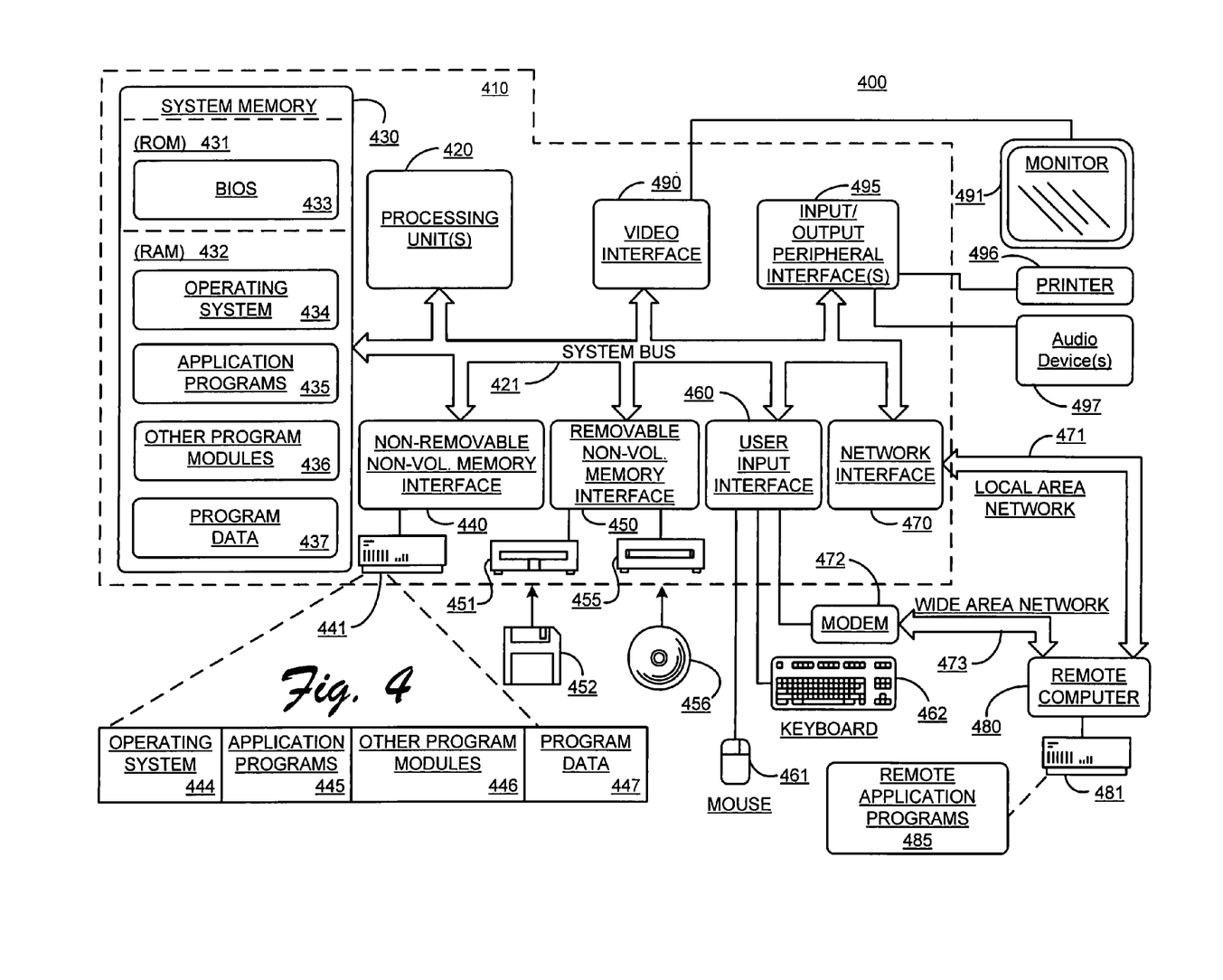
FIG. 4 illustrates an example of a suitable computing environment on which file loading synchronization may be fully or partially implemented.

FIG. 4 illustrates an example of a suitable computing environment for file loading synchronization may be fully or partially implemented. Exemplary computing environment 400 is only one example of a suitable computing environment for the exemplary system of FIG. 1 and exemplary operations of FIGS. 2 and 3, and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 4, an exemplary system for file loading synchronization includes a general purpose computing device in the form of a computer 410 implementing, for example, system 100 of FIG. 1. The following described aspects of computer 410 are exemplary implementations of client computing device 102 of FIG. 1. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 438.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 448. Note that these components can either be the same as or different from operating system 434, application programs 435, other program modules 436, and program data 438. Application programs 435 includes, for example program modules 104 of FIG. 1. Program data 438 includes, for example, program data 106 of FIG. 1. Operating system 444, application programs 445, other program modules 446, and program data 448 are given different numbers here to illustrate that they are at least different copies.

In one implementation, a user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. In addition to the monitor, computers may also include other peripheral output devices such as speakers 498 and printer 496, which may be connected through an output peripheral interface 495.

The computer 410 operates in a networked environment using logical connections to one or more remote computers, such as a remote computer 480. The remote computer 480 may be a personal computer, a server, a router, a network PC, a mobile computing device, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 481 and a wide area network (WAN) 483, but may also include other networks. Such networking environments are commonplace in offices, enterprise-wide computer networks, intranets and the Internet.

When used in a LAN networking environment, the computer 410 is connected to the LAN 481 through a network interface or adapter 480. When used in a WAN networking environment, the computer 410 typically includes a modem 482 or other means for establishing communications over the WAN 483, such as the Internet. The modem 482, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

Conclusion

Although the systems and methods for file loading synchronization have been described in language specific to structural features and/or methodological operations or actions, it is understood that the implementations defined in the appended claims are not necessarily limited to the specific features or actions described. For example, although the systems and methods of FIGS. 1 through 4 have been described with respect to a computing environment that utilizes a runtime providing services to managed code, the described systems and methods are applicable to computing environments that are independent of a runtime. In such an alternate environment, an assembly is synonymous with one or more files for execution (e.g., module(s)) and associated data. Accordingly, the specific features and operations are disclosed as exemplary forms of implementing the claimed subject matter.

The invention claimed is:

1. A method comprising:
    sequentially ordering executable file loading operations into partial loading levels, the partial loading levels being incremental and sequential with respect to one another, each of the partial loading levels comprising a respective set of partial loading operations independent and distinct of sets of partial loading operations of all other partial loading levels, the sets of partial loading operations being sufficient to load an executable file, wherein each of the partial loading levels comprises arbitrary operations as a function of desired file loading architecture;

identifying one of the partial loading levels as an allowed partial loading level;

partially loading, into a computing device, the executable file to the allowed partial loading level before performing a complete load of the executable file, the sets of partial loading operations completed comprising the sets of partial loading operations associated with the allowed partial loading level and all lower partial loading levels, wherein the partial loading further comprises limiting recursive loads to a lesser partial loading level which is lesser than the allowed partial loading level to prevent deadlock conditions, wherein the executable file is partially loaded only to the allowed partial loading level independent of whether the allowed partial loading level is a final partial loading level; and halting the partial loading at the allowed partial loading level, the allowed partial loading level corresponding to sets of partial loading operations associated with one or more of the partial loading levels, wherein the executable file is not fully loaded, wherein after halting the partial loading at the allowed partial loading level, the executable file is in a well-defined state at the allowed partial loading level and is partially initialized, wherein partially initialized is a coherent state, and wherein after halting the partial loading at the allowed partial loading level, the executable file has been passed through operations associated with respective levels of previous partial loading levels implemented by a loader on assembly.

2. A method as recited in claim 1, wherein the executable file is an assembly or a component of an assembly.

3. A method as recited in claim 1, wherein the partial loading further comprises:
   executing a set of partial loading operations associated with a first partial loading level of the partial loading levels with a first thread of execution; and
   implementing a set of partial loading operations associated with a second partial loading level of the partial loading levels with a second thread of execution, the first and the second threads of execution being different threads in a multithreaded operating environment.

4. A method as recited in claim 1, wherein the partial loading further comprises requesting a partial loading level that is less than or equal to the allowed partial loading level.

5. A method as recited in claim 1, wherein the partial loading further comprises loading of domain neutral assemblies by determining whether to create the executable file or share another file in a different application domain associated with the executable file.

6. A method as recited in claim 1, wherein the partial loading further comprises enforcing an invariant by preventing from running code in an application domain until the executable file has been fully loaded, wherein the code is associated with the executable file, the enforcing comprising:
   tracking loaded dependencies of the executable file; and
   when application domain sharing is desired, propagating loads associated with the executable file to one or more other application domains that share one or more related assemblies or modules.

7. A method as recited in claim 1, wherein the partial loading further comprises:
   determining that a dependency of the executable file can be partially loaded to at least the allowed partial loading level; and
   responsive to the determining and if a deadlock is not encountered, partially loading the dependency of the executable file to at least the allowed partial loading level.

8. A method as recited in claim 1, wherein the partial loading further comprises providing same level dependency loads with explicit deadlock detection by:
   determining that one or more dependencies of the executable file need to be fully loaded; and
   responsive to the determining, implementing operations associated with all of the partial loading levels to fully load the one or more dependencies.

9. A method as recited in claim 8, further comprising:
   identifying an unexpected circular dependency; and
   responsive to the identifying, indicating that the unexpected circular dependency was encountered.

10. A method as recited in claim 1, wherein the partial loading levels that are not used to generate the well-defined state are respective deferred partial loading levels.

11. A method as recited in claim 1, wherein the well-defined state is a function of actual partial loading operations performed in particular partial loading levels of the partial loading levels used to load the executable file.

12. A computer-readable storage medium storing computer-executable instructions, implemented at least in part by a computing device, that when executed, perform acts comprising:
   sequentially ordering executable file loading operations into sets of loading operations corresponding to a plurality of partial loading levels, the plurality of partial loading levels being incremental and sequential with respect to one another, each of the plurality of partial loading levels comprising a respective set of partial loading operations independent and distinct of sets of partial loading operations of all other partial loading levels, the sets of partial loading operations being sufficient to load an executable file, wherein each of the plurality of partial loading levels comprises arbitrary operations as a function of desired file loading architecture;
   identifying one of the plurality of partial loading levels as an allowed partial loading level;
   partially loading an executable file into a computing device; and
   halting the partial loading of the executable file at the allowed partial loading level before performing a complete load of the executable file, the allowed partial loading level corresponding to sets of partial loading operations associated with one or more of the plurality of partial loading levels, wherein the executable file is not fully loaded,
   wherein the sets of partial loading operations completed comprise the sets of partial loading operations associated with the allowed partial loading level and all lower plurality of partial loading levels,
   wherein the partial loading further comprises limiting recursive loads to a lesser partial loading level which is lesser than the allowed partial loading level to prevent deadlock conditions,
   wherein the executable file is partially loaded only to the allowed partial loading level independent of whether the allowed partial loading level is a final partial loading level, wherein after halting the partial loading of the executable file at the allowed partial loading level, the executable file is in a well-defined state that is partially initialized, wherein partially initialized is a coherent state, and wherein after halting the partial loading of the executable file at the allowed partial loading level, the executable file has been passed through operations associated with respective levels of previous plurality of partial loading levels implemented by a loader on assembly.

13. A computer-readable storage medium as recited in claim 12, wherein the executable file is an assembly or a component of an assembly.

14. A computer-readable storage medium as recited in claim 12 further comprising:

executing a set of partial loading operations associated with a first partial loading level of the plurality of partial loading levels with a first thread of execution; and implementing a set of partial loading operations associated with a second partial loading level of the plurality of partial loading levels with a second thread of execution, the first and the second threads of execution being different threads in a multithreaded operating environment.

15. A computer-readable storage medium as recited in claim 12 further comprising requesting a partial loading level that is less than or equal to the allowed partial loading level.

16. A computer-readable storage medium as recited in claim 12 further comprising handling loading of domain neutral assemblies by determining whether to create the executable file or share another file in a different application domain associated with the executable file.

17. A computer-readable storage medium as recited in claim 12 further comprising enforcing an invariant by preventing from running code in an application domain until the executable file has been fully loaded, wherein the code is associated with the executable file, the enforcing comprising:

tracking loaded dependencies of the executable file; and when application domain sharing is desired, propagating loads associated with the executable file to one or more other application domains that share one or more related assemblies or modules.

18. A computer-readable storage medium as recited in claim 12 further comprising:

determining that a dependency of the executable file can be partially loaded to at least the allowed partial loading level; and responsive to the determining and if a deadlock is not encountered, loading the dependency of the executable file to at least the allowed partial loading level.

19. A computer-readable storage medium as recited in claim 12 further comprising providing same level dependency loads with explicit deadlock detection by:

determining that one or more dependencies of the executable file need to be fully loaded; and responsive to the determining, implementing operations associated with all of the plurality of partial loading levels to fully load the one or more dependencies.

20. A computer-readable storage medium as recited in claim 19 further comprising:

determining that the one or more dependencies of the executable file were loaded to a partial loading level of the plurality of partial loading levels that is less than or equal to two partial loading levels less than the allowed partial loading level; and responsive to the determining, indicating that an unexpected circular dependency was encountered.

21. A computing device comprising:

a processor; and a memory coupled to the processor, the memory storing computer-executable instructions, that when executed, perform acts comprising:

sequentially ordering executable file loading operations into partial loading levels, the partial loading levels being incremental and sequential with respect to one another, each of the partial loading levels comprising a respective set of partial loading operations independent and distinct of sets of partial loading operations of all other partial loading levels, the sets of partial loading operations being sufficient to load an executable file, wherein each of the partial loading levels comprises arbitrary operations as a function of desired file loading architecture;

partially loading the executable file into the computing device;

identifying one of the partial loading levels as an allowed partial loading level; and halting the partial loading at the allowed partial loading level before performing a complete load of the executable file, the allowed partial loading level corresponding to sets of partial loading operations associated with one or more of the partial loading levels, wherein the executable file is not fully loaded, wherein the sets of partial loading operations completed comprise the sets of partial loading operations associated with the allowed partial loading level and all lower partial loading levels, wherein the partial loading further comprises limiting recursive loads to a lesser partial loading level which is lesser than the allowed partial loading level to prevent deadlock conditions, wherein the executable file is partially loaded only to the allowed partial loading level independent of whether the allowed partial loading level is a final partial loading level, wherein after halting the partial loading at the allowed partial loading level, the executable file is in a well-defined state that is partially initialized, wherein partially initialized is a coherent state, and wherein after halting the partial loading at the allowed partial loading level, the executable file has been passed through operations associated with respective levels of previous partial loading levels implemented by a loader on assembly.

22. computing device as recited in claim 21, wherein the executable file is an assembly or a component of an assembly.

23. A computing device as recited in claim 21 further comprising:

executing a set of partial loading operations associated with a first partial loading level of the partial loading levels with a first thread of execution; and implementing a set of partial loading operations associated with a second partial loading level of the partial loading levels with a second thread of execution, the first and the second threads of execution being different threads in a multithreaded operating environment.

24. A computing device as recited in claim 21 further comprising handling loading of domain neutral assemblies by determining whether to create the executable file or share a file in a different application domain associated with the executable file.

25. A computing device as recited in claim 21 further comprising:

determining that a dependency can be loaded to at least the allowed partial loading level; and responsive to the determining and if a deadlock is not encountered, partially loading the dependency to at least the allowed partial loading level.

26. A computing device as recited in claim 21 further comprising:

providing same level dependency loads with explicit deadlock detection;

determining that one or more dependencies of the executable file need to be fully loaded; and responsive to the determining, implementing operations associated with all partial loading levels to fully load the one or more dependencies.

27. A computing device as recited in claim 26 further comprising:

finding an unexpected circular dependency; and responsive to the finding, indicating the presence of the unexpected circular dependency.

28. A computing device comprising:

a memory;

a processor;

dividing means for segmenting file loading operations into partial loading levels, the partial loading levels being incremental and sequentially ordered with respect to one another, each partial loading level comprising a respective set of partial loading operations independent and distinct of sets of partial loading operations of all other partial loading levels, the sets of partial loading operations being sufficient to load an executable file, wherein each of the partial loading levels comprises arbitrary operations as a function of desired file loading architecture;

loading means for partially loading the executable file to an allowed partial loading level in the memory before performing a complete load of the executable file, the sets of partial loading operations completed comprising the sets of partial loading operations associated with the allowed partial loading level and all lower partial loading levels, the allowed partial loading level corresponding to sets of partial loading operations associated with one or more of the partial loading levels, wherein the partial loading further comprises limiting recursive loads to a lesser partial loading level which is lesser than the allowed partial loading level to prevent deadlock conditions, wherein the executable file is partially loaded only to, and halted at, the allowed partial loading level when a deadlock is not encountered independent of whether the allowed partial loading level is a final partial loading level such that the executable file is not fully loaded, wherein after halting the partial loading of the executable file at the allowed partial loading level, the executable file is in a well-defined state that is partially initialized, wherein partially initialized is a coherent state, and wherein after halting the partial loading of the executable file at the allowed partial loading level, the executable file has been passed through operations associated with respective levels of previous partial loading levels implemented by a loader on assembly.

29. A computing device as recited in claim 28, wherein the loading means further comprises:

determining means to determine that a dependency can be partially loaded to at least the allowed partial loading level; and responsive to the determining means, and if a deadlock is not encountered, loading means to partially load the dependency in the memory to at least the allowed partial loading level.

30. A computing device as recited in claim 28 that can provide the same level dependency loading with explicit deadlock detection, the loading means further comprising:

determining means to determine that one or more dependencies of the executable file need to be fully loaded; and responsive to the determining, implementing means to implement operations associated with each of the partial loading levels to fully load in the memory the one or more dependencies.

31. A computer-readable storage medium storing computer-executable instructions, implemented at least in part by a computing device, that when executed, perform acts comprising:

sequentially ordering executable file loading operations into sets of loading operations corresponding to a plurality of partial loading levels, the plurality of partial loading levels being incremental and sequential with respect to one another, each of the plurality of partial loading levels comprising a respective set of partial loading operations independent and distinct of sets of partial loading operations of all other partial loading levels, the sets of partial loading operations being sufficient to load an executable file, wherein each of the partial loading levels comprises arbitrary operations as a function of desired file loading architecture;

identifying one of the plurality of partial loading levels as an allowed partial loading level;

partially loading an executable file into a computing device, wherein the partial loading further comprises limiting recursive loads to a partial loading level that is lesser than or equal to the allowed partial loading level to prevent deadlock conditions by consulting a bookkeeping data structure to determine whether the partial loading level for limiting recursive loads is less than or equal to the allowed partial loading level, and wherein the executable file is partially loaded only to the allowed partial loading level independent of whether the allowed partial loading level is a final partial loading level; and halting the partial loading of the executable file at the allowed partial loading level before performing a complete load of the executable file, the allowed partial loading level corresponding to sets of partial loading operations associated with one or more of the plurality of partial loading levels, wherein the executable file is not fully loaded, wherein the sets of partial loading operations completed comprise the sets of partial loading operations associated with the allowed partial loading level and all lower plurality of partial loading levels, wherein after halting the partial loading of the executable file at the allowed partial loading level, the executable file is in a well-defined state that is partially initialized, wherein partially initialized is a coherent state, and wherein after halting the partial loading of the executable file at the allowed partial loading level, the executable file has been passed through operations associated with respective levels of previous plurality of partial loading levels implemented by a loader on assembly.

* * * * *